United States Patent [19]

Heslop

[11] 4,065,062
[45] Dec. 27, 1977

[54] STACK FEEDER

[75] Inventor: Lorne C. Heslop, Guelph, Canada

[73] Assignee: McKee Bros. Limited, Elmira, Canada

[21] Appl. No.: 672,820

[22] Filed: Apr. 1, 1976

Related U.S. Application Data

[63] Continuation-in-part of Ser. No. 571,833, April 25, 1975, abandoned.

[51] Int. Cl.² ............................................. B02C 13/04
[52] U.S. Cl. .................................. 241/101.7; 198/511; 198/518; 241/194; 241/280; 299/76
[58] Field of Search ..................... 241/101.7, 194, 277, 241/280, 186 R; 198/511, 518; 299/76

[56] References Cited

U.S. PATENT DOCUMENTS

| | | | |
|---|---|---|---|
| 2,779,452 | 1/1957 | Oswalt | 198/9 |
| 2,813,684 | 11/1957 | Jensen | 241/194 |
| 2,986,186 | 5/1961 | White | 241/277 |
| 3,472,298 | 10/1969 | Vinogradov et al. | 299/76 X |
| 3,741,051 | 6/1973 | Brooks et al. | 241/101.7 X |
| 3,860,291 | 1/1975 | Rauch et al. | 299/76 X |
| 3,920,190 | 11/1975 | Kanengieter et al. | 241/101.7 X |

*Primary Examiner*—Gerald A. Dost
*Assistant Examiner*—Howard N. Goldberg
*Attorney, Agent, or Firm*—Rogers, Bereskin & Parr

[57] ABSTRACT

A stack feeder is described for use in association with a stack mover arranged to advance a haystack in the longitudinal direction of the stack feeder. The feeder includes a base frame and a flail assembly located above the base frame and positioned transversely with respect to said longitudinal direction. Means are provided coupling the flail assembly to the base frame for pivotal movement with respect to the frame about a horizontal axis so that the flail assembly can be moved up and down along an arcuate path above the frame. The flail assembly includes a rotary flail and a hood which extends longitudinally of the flail. The flail is made up of an elongate support rotatable about a horizontal axis, and a plurality of knives carried by the support for action on a haystack in use. Means are provided to move the flail assembly along said arcuate path. The feeder also includes means for rotating the flail at a relatively high speed. Conveyor means are supported on the base frame below the flail assembly. Said conveyor means extend transversely of the base frame to a discharge location positioned laterally of the frame. In use, the leading end portion of a haystack advanced to a position in said arcuate path of the flail assembly is shredded and fluffed up by the action of the rotary flail upon movement of the flail assembly along said path. The resulting conditioned hay is directed downwardly onto the conveyor means for discharge at said discharge location.

7 Claims, 12 Drawing Figures

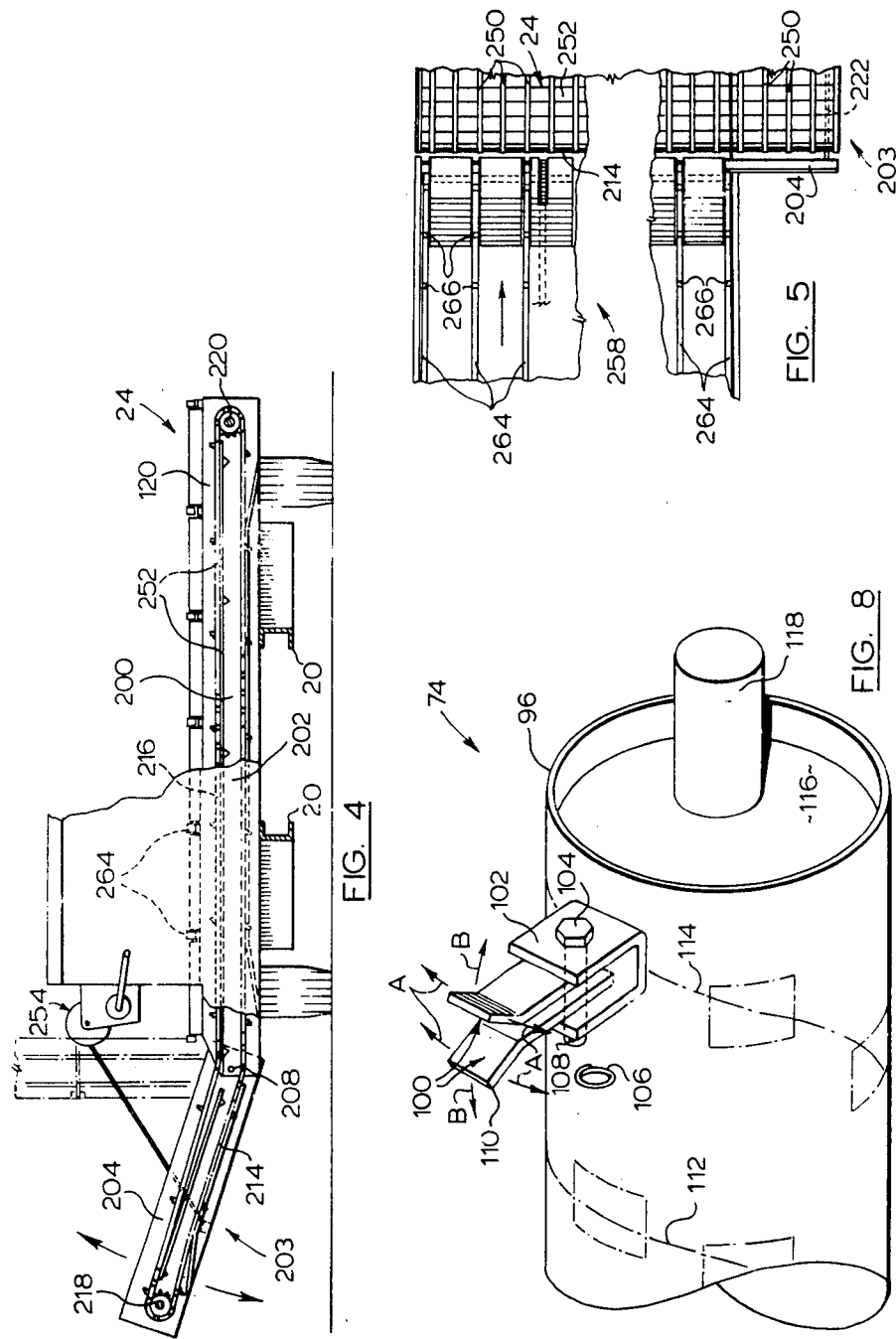

STACK FEEDER

This application is a Continuation-In-Part of application Ser. No. 571,833 filed Apr. 25, 1975 (now abandoned).

This invention relates to a stack feeder used to feed hay or other animal foodstuff from a stack. For convenience of description, reference will hereinafter be confined to stack feeders for feeding hay from a haystack, although it is to be understood that the machine may be used for other appropriate materials.

The stack feeder is used in conjunction with a conveying device called a stack mover which advances the haystack towards the stack feeder. A conventional stack feeder includes a cutter which cuts a slice from the leading end of a haystack advanced by a stack mover. The slice falls onto a conveyor by which it is delivered to a discharge location. The stack mover then advances the stack further and another slice is cut off by the stack feeder. This sequence is repeated until all of the haystack has been used up. A stack mover and a stack feeder may be coupled together and towed behind a tractor alongside an animal feed trough while the mover and feeder are in operation. The conveyor of the stack feeder is arranged to discharge hay into the trough.

U.S. Pat. No. 3,741,051 discloses an example of an apparatus which operates by slicing the haystack. The apparatus is in fact a combined stack mover and feeder and employs a cutter in the form of a sickle to cut successive slices from a haystack. A problem with the stack feeder shown in U.S. Pat. No. 3,741,051 is that the stacked hay which it slices is often relatively tightly compressed. Slices cut from such a stack often contain dense chunks which are not in the most suitable form for eating by animals, resulting in wastage. In addition, a conventional cutter of the kind shown in U.S. Pat. No. 3,741,051 applies downward pressure to the front edge of the stack as it cuts. When the cutter is raised after cutting a slice, the downward pressure on the front end of the stack is relieved and the previously compressed front end expands upwardly and forwardly, into the still rising cutter mechanism. Then, as the cutter continues to rise, it tips the stack rearwardly slightly. After several slices have been cut, the entire stack tends to tip over rearwardly, rendering further cutting difficult. In addition, the consistency of a stack varies considerably due to material type and weather conditions. Weather conditions will create frozen stack material and/or wet, tough material. Material type can produce a stack of long, stringy material or dense, fine material. In these extreme conditions, a conventional cutter of the kind shown in U.S. Pat. No. 3,741,051 is unable to penetrate the material sufficiently to properly perform its task.

Accordingly, an object of the present invention is to provide a stack feeder which, when used, for example, with a haystack, removes and conditions the hay from the stack in a form more suitable for use by animals. Also, the problem of tipping the stack rearwardly is reduced. In addition, the stack feeder of the present invention does not penetrate the stack material, but rather, removes the material from its path, thereby tending to avoid or minimize the problem of the cutter disclosed in the previously-mentioned patent. The stack feeder according to the invention is normally used in association with a stack mover arranged to advance a haystack in the longitudinal direction of the stack feeder. The feeder includes a base frame and a flail assembly located above the base frame and positioned transversely with respect to said longitudinal direction. Means are provided coupling the flail assembly to the base frame for pivotal movement with respect to the frame about a horizontal axis so that the flail assembly can be moved up and down along an arcuate path above the frame. The flail assembly includes a rotary flail and a hood which extends longitudinally of the flail. The flail is made up of an elongate support rotatable about a horizontal axis, and a plurality of knives carried by the support for action on a haystack in use. Means are provided to move the flail assembly along said arcuate path. The feeder also includes means for rotating the flail at a relatively high speed. Conveyor means are supported on the base frame below the flail assembly. Said conveyor means extend transversely of the base frame to a discharge location positioned laterally of the frame. In use, the leading end portion of a haystack advanced to a position in said arcuate path of the flail assembly is shredded and fluffed up by the action of the rotary flail upon movement of the flail assembly along said path. The resulting conditioned hay is directed downwardly onto the conveyor means for discharge at said discharge location.

The invention will be better understood by reference to the accompanying drawings which illustrate various embodiments thereof. In the drawings:

FIG. 4 is a vertical sectional view in the direction of arrows IV—IV of FIG. 3 and is partly broken away;

FIG. 5 is plan view of part of FIG. 3 in the direction of arrows V—V;

FIG. 8 is a perspective view of one end of the flail and illustrates a detail of its construction;

Figure 1:
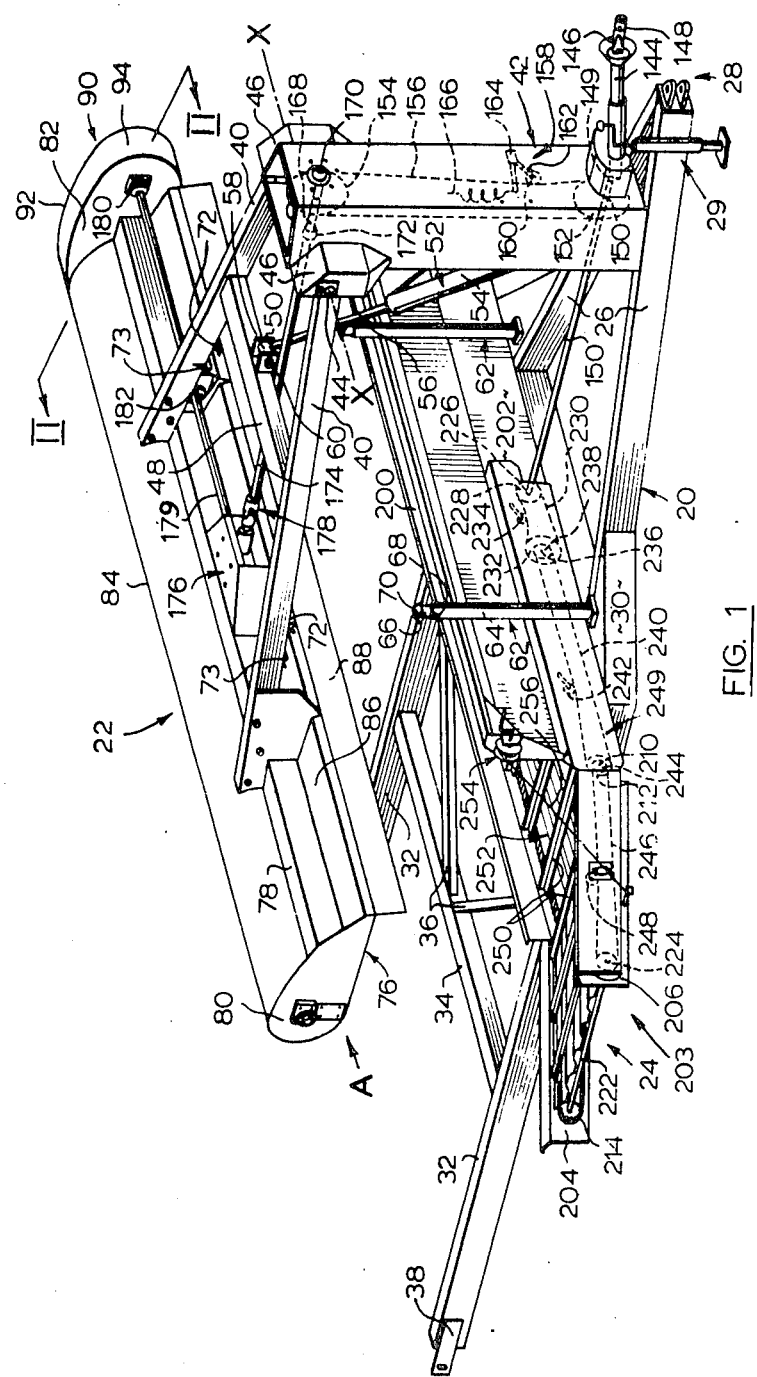
FIG. 1 is a view from the front and one side of a stack feeder according to the invention.

Referring first to FIG. 1, the principal components of the stack feeder are a base frame 20 of generally A-frame shape; a flail assembly 22 which is supported in an overhead position above the frame 20; and a conveyor 24 located on the frame 20 below the flail assembly 22. Frame 20 includes a pair of side members 26 which converge to form the apex of the A-frame. A coupling 28 is provided at the junction of the members 26 so that the stack feeder can be coupled to a tractor hitch in use. A screw jack 29 is fitted to one of the side members 26 for supporting the feeder at other times. The side members 26 are coupled by fillets 30 to respective parallel side members 32. The frame 20 is completed by cross members 34 and bracing members 36. Each of the side members 32 is provided at its outer end with an apertured coupling plate 38 (only one of which is visible in FIG. 1) by which the stack feeder can be coupled to a stack mover in use (as will be described).

Flail assembly 22 (which will be described in detail later) is carried in an overhead position above the base frame by coupling means including a boom formed by pair of arms 40 rigidly fixed to the flail assembly at their outer ends. The inner ends of the arms 40 are pivotally coupled to a support structure 42 which is arranged in an upstanding position on the base frame 20 adjacent the tractor coupling 28. The pivots for the inner ends of the arms 40 are formed by pivot pins 44 (only one of which is visible in FIG. 1) arranged in housings 46 at opposite sides of the upper end of the support structure 42. Pins 44 define a horizontal pivot axis X—X.

Figure 3:
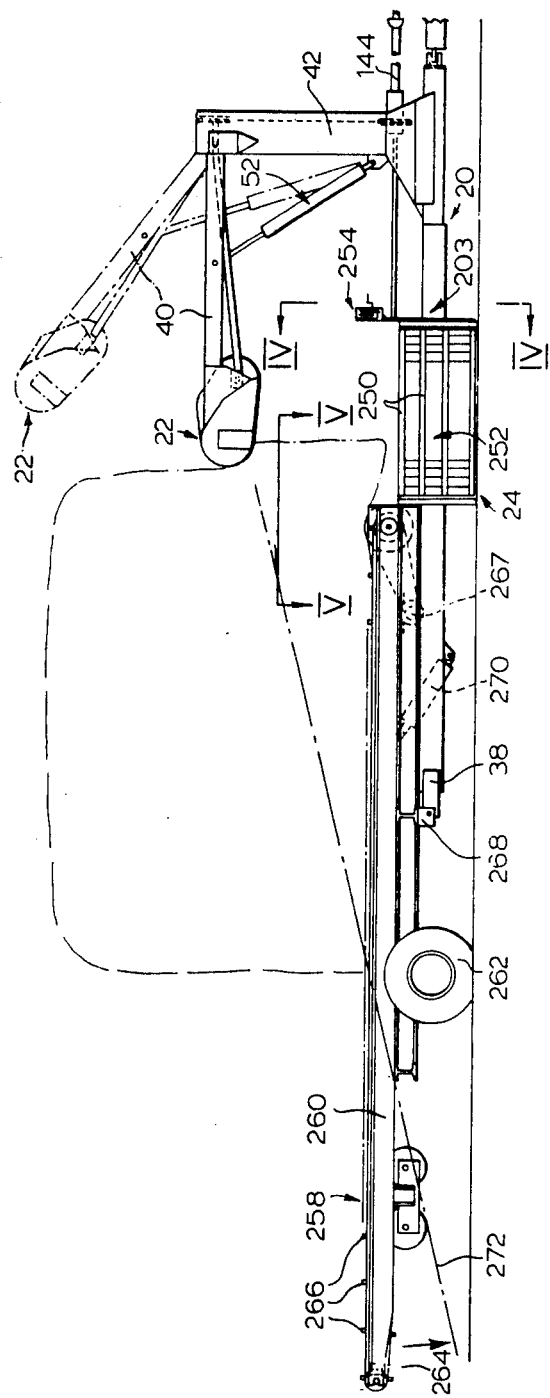
FIG. 3 is a side view of a stack feeder of FIG. 1 shown coupled to a stack mover.

The arms 40 are joined by a cross-member 48 which is fitted with a pair of spaced ears 50. A hydraulic piston and cylinder unit 52 is coupled between the ears 50 on cross-member 48 and the support structure 42 for the purpose of raising and lowering the arms 40 and hence the flail assembly 22 about the pivot axis X—X. The cylinder 54 of unit 52 is coupled to the support structure 42 and the piston 56 of the unit is provided at its outer end with a collar 58 which fits between the ears 50 and which receives a coupling pin 60 passing through aligned apertures in the ears 50. FIG. 3 illustrates how the flail assembly 22 can be raised and lowered in an arcuate path above the base frame 20 by means of the piston and cylinder unit 52.

Referring back to FIG. 1, a pair of support columns 62 upstand from the chassis 20 and are positioned below the respective arms 40 carrying the flail assembly so as to support the arms when the stack feeder is not in use and the flail assembly 22 is in its lowermost or "down" position. It will, of course, be appreciated that in FIG. 1 the flail assembly is shown elevated for the purpose of illustration only and will in practice occupy the down position when not in use. Each of the columns 62 includes an outer sleeve 64 rigidly fixed to the base frame 20 at its lower end, and an inner rod or shaft 66 slidably located in the sleeve. Shaft 66 can be locked in an adjusted axial position with respect to the sleeve 64 by a stop bolt 68 which bears against the shaft. An angle-section cap 70 surmounts the upper end of shaft 66. A pair of complementary angle-section seats 72 (one for each column 62) are fixed to the undersides of the arms 40 to ensure proper location of the arms on the support columns 62 when the flail assembly is in its down position. An additional pair of seats 73 are also provided on the arms for use in the event that the flail assembly is to be supported in an upper position (e.g., for maintenance). The shafts 66 of the columns 62 would then be fully extended.

Figure 9:
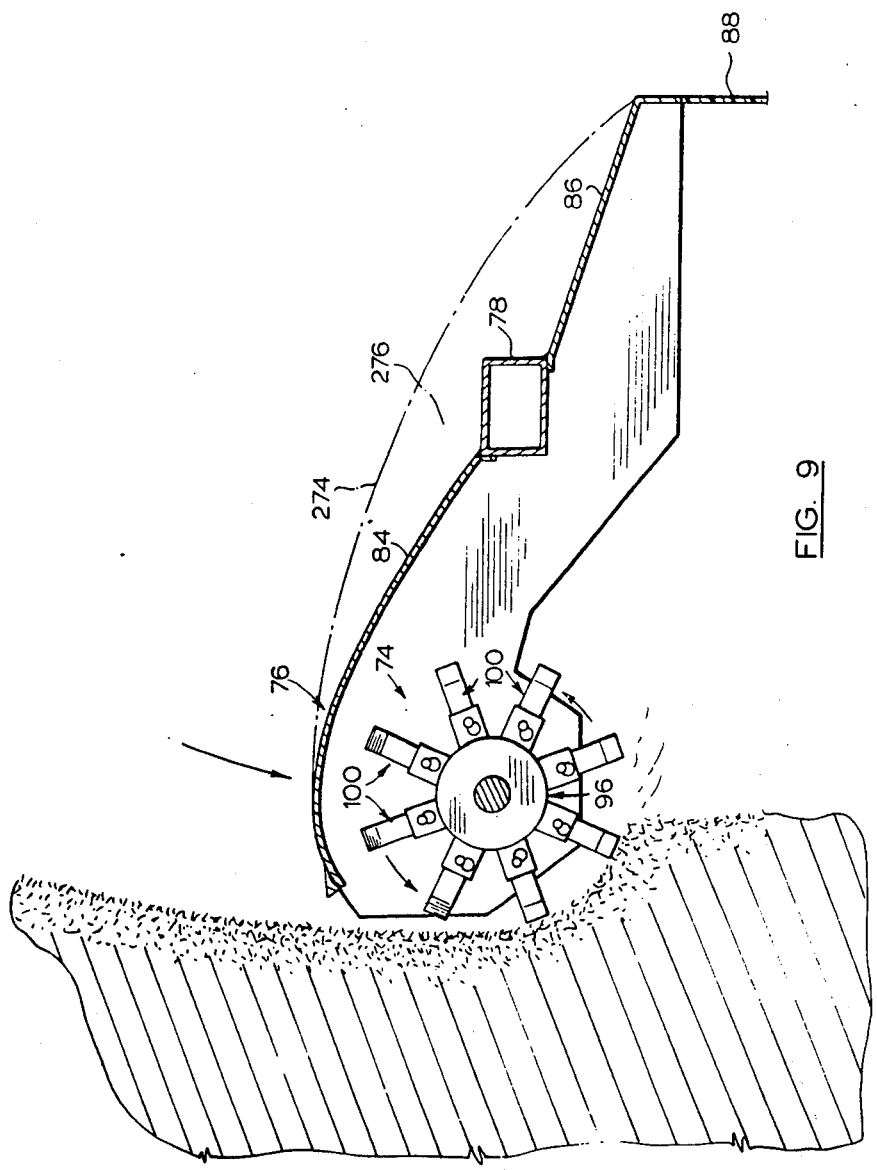
FIG. 9 is a side view of the flail in operation.

The flail assembly 22 includes a flail generally denoted 74 in FIGS. 6 to 9. The flail is rotatably supported in a housing 76 which also forms a hood for the flail. As shown in FIGS. 1 and 9, the housing 76 includes a main box section structural member 78 which extends longitudinally of the assembly. The flail assembly support arms 40 are coupled to this member. End plates 80 and 82 are attached to the structural member 78 and a curved plate 84 extends between the end plates 80 and 82. The flail housing is completed by plates 86 and by a flexible shield 88 which depends from the trailing edge of the flail assembly. A housing 90 for part of the flail drive (to be described) is provided at the outer side of the end plate 82 of the flail assembly. Housing 90 includes an outer end plate 92 and a cover plate 94 which extends between the plates 82 and 92.

As can be seen from the drawings (particularly FIG. 6), the hood 76 extends longitudinally above the flail and is shaped so that hay entrained by the flail in use (as will be described) is directed downwardly onto the conveyor 24. The spacing between the hood 76 and the flail 74 is preferably between ¼ and ½ inch. It has been found that this spacing tends to minimize the amount of material which re-circulates with the flail in use. The flexible shield 88 assists in directing the hay onto the conveyor 24 and is flexible so as to avoid being damaged or causing damage when the flail assembly is in its "down" position.

Figure 7:
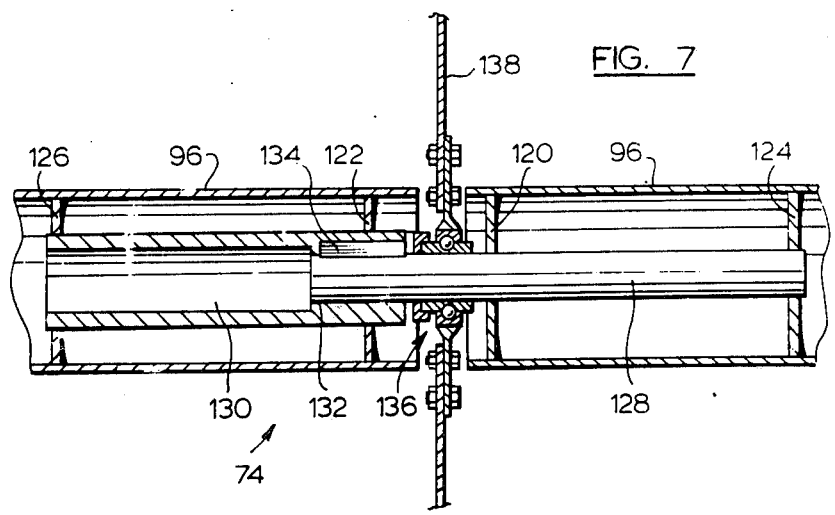
FIG. 7 is an axial sectional view through the central part of the flail.
Figure 6:
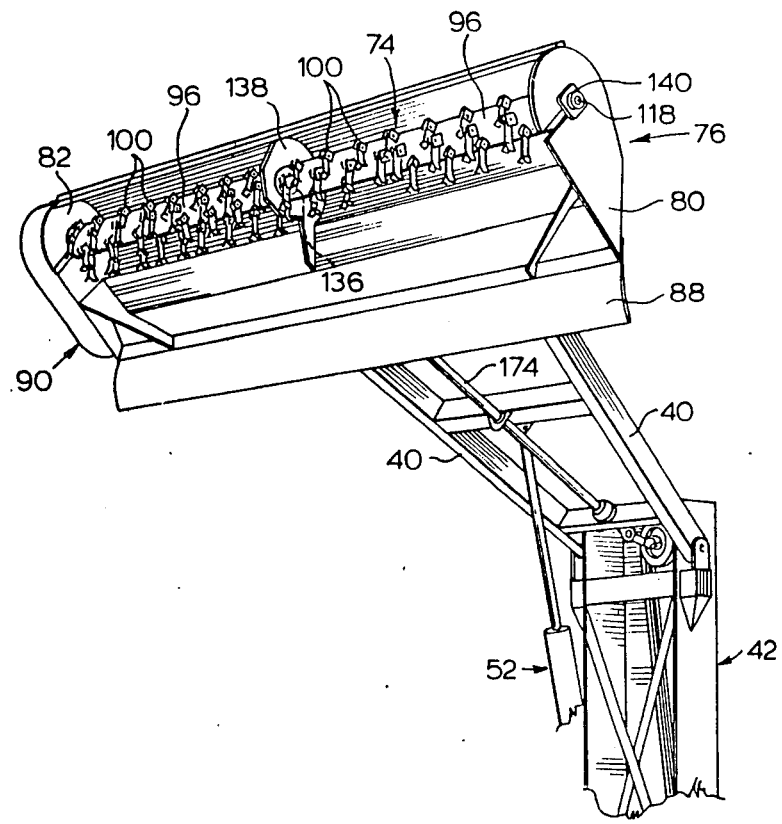
FIG. 6 is a view generally in the direction of arrow 'A' in FIG. 1, and illustrates the flail assembly of the feeder.

Reference will now be made to FIG. 6, 7 and 8 in describing the flail 74. As can be seen from FIG. 6, the flail includes a cylindrical axial support make in two co-axial tubular sections 96. Each section has a number of knives 100 positioned on its outer surface. The knives are arranged in pairs, the knives in each pair being pivotally coupled between a pair of parallel brackets 102 secured to the relevant section 96 (see FIG. 8). Each knife 100 is in the form of a plate having adjacent one end a slot which is elongated in the direction of the length of the knife and through which passes a plain headed pin 104 received in aligned holes in the brackets 102. Accordingly, the knives can swing about pin 104 as indicated by arrows A in FIG. 8 and can swing laterally at their outer ends, as indicated by arrows B due to the provision of said elongate slots. A spiral retaining washer 106 (shown exploded in FIG. 8) is received in a hole 108 in the outer end of the pin 104. Each knife 100 includes an outwardly angled end portion 110, with the result that the two knives in each pair together defines a generally Y-shaped configuration when the knives are positioned as shown in FIG. 8.

It will be appreciated that the knives 100 are free to turn on the pins 104. When the flail is stationary, therefore, the knives will normally hang vertically downwards. Only under the action of centrifugal force when the flail is rotating will the knives be thrown radially outwards as seen in FIG. 8. FIG. 6 shows the knives when the flail is stationary.

The knife pairs are arranged on the tubular support sections 96 in a double helical pattern. In other words, there are two series of knife pairs, each arranged on a helical path around the relevant support section 96. The initial parts of the two paths are indicated in FIG. 8 by the numerals 112 and 114.

Each of the support sections 96 of the flail is hollow and is fitted with internal end plates. One of these plates is visible at 116 in FIG. 8. A stub axle 118 projects from the end plate 116.

FIG. 7 is a cross-sectional view of the junction between the two support sections 96 of the flail. The end plates of the respective sections are visible at 120 and 122 respectively. Located inside each tubular section 96 and spaced from the relevant end plate is a second plate 124, 126 respectively. The plates in each pair 120, 124 and 122, 126 are provided with aligned central apertures. The apertures in plates 120, 124 receive a shaft 128 which projects axially from the end of the support, and the apertures in the plates of the other support receive a sleeve 130. The sleeve has an internal bore, the outer end portion 132 of which receives the shaft 128. A key 134 couples the shaft 128 and sleeve 130. The portion of shaft 128 between the opposed ends of the tubular support sections 96 is located by a bearing assembly 136 carried by a plate 138 (see also FIG. 6) forming part of the flail assembly.

Referring to FIG. 6, the bearing 136 and plate 138 locate the centre of the flail. The right-hand support section 96 is located at its outer end by bearing 140 on the outer face of the end plate 80 of the flail assembly, which bearing receives the stub axle 118. The outer end of the other support section 96 is located by a bearing (not visible) at the outer side of the end plate 82. This bearing locates a stub axle similar to stub axle 118, which projects from the end of the left-hand support section 96. Part of that stub axle is visible at 142 in FIG. 2. The flail is driven in rotation by way of stub axle 142 as will now be described.

Referring back to FIG. 1, it will be remembered that the stack feeder is intended to be towed behind a tractor. The drive for the stack feeder is taken from the power take-off of the tractor. For this purpose, the feeder is provided with a main drive input shaft 144 having at its outer end a universal joint 146 fitted with a coupling 148 for attachment to the tractor power take-off. A further universal joint indicated at 149 is fitted to the inner end of shaft 144 and is coupled to the outer end of a horizontal shaft 150 rotatably supported on the longitudinal median line of the stack feeder. The outer end portion of shaft 150 extends through the support structure 42 and carries a pulley 152 inside said structure. A second, similar pulley 154 is provided inside the support structure 42 adjacent its upper end and is positioned parallel to pulley 152. An endless belt 156 extends around the two pulleys to drivably couple pulley 154 with pulley 152. A belt tensioning device 158 is provided inside the structure 42. The device includes a wheel 160 which runs in contact with the belt 156 and which is carried by one arm of a bell crank lever 162 pivoted to the structure 42 at 164. The other arm of said lever 162 is biassed by means of a spring 166 to apply the wheel 160 against the belt. The tension of the spring can be adjusted to vary the belt tension. Pulley 154 is carried on a shaft 168 rotatably supported in bearings 170 and coupled at its outer end to a double universal joint indicated at 172. The double universal joint is in turn coupled to a longitudinal drive shaft 174 which extends from the support structure 42 to the flail assembly 22. At its forward end the shaft 174 is coupled to the input shaft of a gearbox 176 by way of a further universal joint 178. Gearbox 176 contains a pair of simple bevel gears which couple the input shaft 174 with an output shaft 179 extending longitudinally of the flail assembly 22. Shaft 179 extends from the gearbox 176 to the housing 90 at the far end of the flail assembly in FIG. 1. A bearing 180 is provided on the housing to receive the shaft. Intermediate its ends, shaft 179 also extends through a bearing 182 on the flail assembly.

Figure 2:
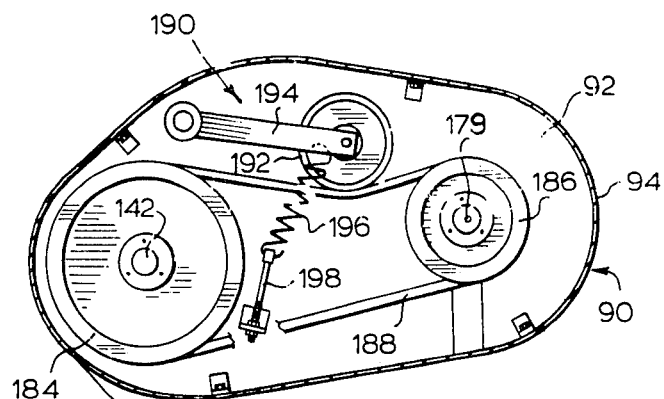
FIG. 2 is a sectional view on line II—II of FIG. 1; and illustrates a detail of the stack feeder.

Referring now to FIG. 2, shaft 179 projects into the housing 90 parallel to the stub axle 142 referred to above. The stub axle 142 and shaft 179 are fitted with respective pulleys 184 and 186 disposed in parallel planes and keyed to their respective shafts. An endless belt 188 extends around the pulleys to drivably couple them together. A belt tension device 190 is also provided inside the housing 90 and includes an idler wheel 192 which bears against the belt and which is rotatably mounted at one end on an arm 194, the opposite end of which is pivoted inside the casing 90. A spring 196 biasses the wheel 192 against the belt 188. An adjusting rod 198 is provided to adjust the biassing effect of the spring 196.

It will be appreciated from the foregoing that a drive coupling is provided between the input shaft 144 (FIG. 1) of the feeder and the flail 74. The various pulleys used in the drive coupling are selected so that the flail rotates at a speed of 1,710 r.p.m. It is believed that a speed in the range 1,600 to 2,600 r.p.m. is to be preferred. The tubular support sections 96 of the flail are of 16 inches in diameter.

Referring now to FIGS. 1 and 4, the transverse conveyor 24 includes front and rear side members 200, 202 which extend transversely of the base frame 20 of the feeder. The left hand end portion of the conveyor in FIGS. 1 and 4 is hingeable with respect to the remainder of the conveyor, forming an adjustable conveyor extension 203. This end portion of the conveyor includes side members 204 and 206 which are pivotally coupled to the respective side members 200 and 202 of the main part of the conveyor. The pivot between the members 204 and 200 is visible at 208 in FIG. 4. The pivot between the members 206 and 202 at the other side of the conveyor is formed by rotatable shaft 210 to which a sprocket 212 is fixed. The purpose of this sprocket will be described later. The conveyor includes a pair of similar endless roller chains which are positioned one at each side of the conveyor and which travel parallel to one another in a direction transversely of the base frame 20 of the feeder. Each of the roller chains 214, 216 extends around two sprockets positioned at respectively opposite ends of the conveyor. The sprockets for chain 214 are visible at 218 and 220 in FIG. 4. Similar sprockets are provided in corresponding positions at the other side of the conveyor for the roller chain 216. The sprockets at the respective ends of the conveyor are carried on common parallel shafts which are rotatably coupled to the side members of the conveyor. The shaft carrying sprocket 220 and the corresponding sprocket for roller chain 216 is freely rotatable in the side members. The sprocket 218 and the corresponding sprocket for chain 216 are also mounted on a common shaft, but that shaft is drivably coupled to the input shaft 144 of the feeder so that the conveyor can be driven from the same source as the flail. This shaft is visible at 222 in FIG. 1 and carries a sprocket 224 used to drive the conveyor, as will now be described.

It will be remembered that the input shaft 144 referred to above drives a horizontal shaft 150 (FIG. 1). The shaft extends from the structure 42 to the side member 202 of the transverse conveyor 24 and is rotatably mounted in a bearing carried by that member. A pulley 228 is fixed to shaft 226 adjacent the bearing and is coupled by an endless belt 230 to a further pulley 232 spaced along member 202. An adjustable idler wheel 234 bears on the belt 230 to maintain a controlled tension. Pulley 232 is fixed to a rotatable shaft 236 which also carries a sprocket 238 of smaller diameter than pulley 232. Sprocket 238 is connected by an endless chain 240 with the sprocket 212 on shaft 210 referred to above. An adjustable idler sprocket 242 is provided to maintain the tension in chain 240. In addition to sprocket 212, shaft 210 carries a smaller sprocket 244 which is coupled by a further endless chain 246 with the driving sprocket 224 of the conveyor referred to above. An adjustable idler sprocket 248 bears on chain 246. The drive belt 230 and associated pulleys and the chains 240 and 246 and associated sprockets are enclosed by panels 249. The sizes of the pulleys and sprockets are selected so that the conveyor 24 is driven at a suitable slow speed concomitant with the required relatively high speed rotation of the flail.

A plurality of angle members 250 extend transversely of the conveyor 24 and are coupled at their outer ends to the respective chains 214 and 216. The angle members 250 are spaced longitudinally of the chains and serve to move along the conveyor hay falling onto its upper surface when the stack feeder is in operation as will be described. To prevent the hay falling through the conveyor between the chains, a platform 252 is provided below the upper run of the conveyor chains. This platform is made up of a number of corrugated panels formed with channels which extend in a longitudinal direction of the conveyor.

The hinged conveyor extension 203 can be raised or lowered as required so that hay leaving the conveyor is delivered at the appropriate height. Adjustment of the extension 203 is effected by means of a winch 254 mounted on the main part of the conveyor and having a cable 256 coupled to the extension. A suitable ratchet arrangement (not shown) is provided to control unwinding of the cable. It will be appreciated that when the stack feeder is not in use, the conveyor extension will be raised into an upright position so that it does not project beyond the lateral confines of the remainder of the stack feeder.

The stack feeder provided by the invention is intended to be used in association with the so-called stack mover arranged to deliver a hay stack into the path of the flail 74 of the feeder. A suitable stack mover is indicated generally at 258 in FIG. 2. Briefly, the stack mover includes a flat bed chassis frame 260 supported on rotatable ground wheels 262. A plurality of parallel conveyor chains 264 extend longitudinally of the chassis 260 of the stack mover (see FIG. 5). The chains are arranged so that their upper runs extend along the top surface of the chassis. A plurality of finger-like formations 266 project outwardly from the chains 264 so as to extend above the upper surface of the chassis 260 along the upper runs of the chains. The chains travel around sprockets at opposite ends of the chassis 260 and the sprockets of the forward end of the chassis are coupled to a hydraulic motor indicated at 267 arranged to drive the chains at an appropriate speed.

The stack mover 258 is coupled to the stack feeder of the present invention by means of a pair of depending lugs 268 on the chassis 260 of the stack mover, which lugs are positioned to correspond with the positions of the coupling plates 38 of the stack feeder (see FIG. 1). Aligned holes in the lugs and coupling plates permit the stack mover and stack feeder to be bolted together. A hydraulic piston and cylinder unit 270 (FIG. 3) is coupled between the base frame 20 of the stack feeder and the chassis 260 of the stack mover. When a haystack is to be loaded onto the stack mover, the piston of the piston and cylinder unit is extended, causing the stack mover to adopt the inclined position indicated by the chain-dotted line 272. The stack mover is then backed up to a haystack so that its rear end is forced into the bottom part of the haystack. The conveyor chains 264 are set in motion so that their upper runs move forwardly (that is, towards the stack feeder). Continued movement of the stack mover rearwardly towards the haystack causes the haystack to move up onto the chassis 260 under the action of the conveyor chains 264. When the haystack is fully on the chassis, the piston of the piston and cylinder unit 270 is retracted to return the stack mover to the horizontal position which it is shown in FIG. 3.

The flail assembly 22 is then elevated approximately to the upper position in which it is shown in chain lines in FIG. 3. This is effected by extending the piston of the piston and cylinder unit 52. The conveyor chains 264 of the stack mover are then operated to advance the haystack to a position within range of the flail assembly. The position of the haystack at this time is not critical, but the stack should not be advanced so that its leading end is too far forward. The flail 74 and the conveyor 24 of the stack feeder are now set in motion and the flail assembly is lowered at a controlled rate by allowing the piston of the piston and cylinder unit 52 to retract under the weight of the flail assembly. As the flail assembly moves down the leading portion of the haystack, the rotating knives 100 act on the hay to shred the leading end portion of the haystack (see FIG. 9) and deliver the hay downwardly onto the conveyor 24. The conveyor continuously discharges the hay laterally as required. It is found that the action of the flail on the hay causes the hay to be fluffed up to a consistency in which the hay is in ideal form for use as an animal feed. Also, in winter, the flail will cut through any ice crust which may have formed on the haystack.

When the whole of the leading end portion of the haystack has been shredded and the flail assembly is in its down position, the piston of the piston and cylinder unit 52 is extended, causing the flail assembly to be returned to its upper position. The haystack is now advanced again into the path of the flail assembly and the next portion of the haystack is ready to be shredded The sequence is repeated until the required amount of hay has been delivered, or until all of the haystack has been used. The hydraulic piston and cylinder units 52 and 270 and also the hydraulic motor 267 for driving the stack mover can be operated from a hydraulic pump driven by the tractor used to tow the stack feeder/mover combination.

Figure 10:
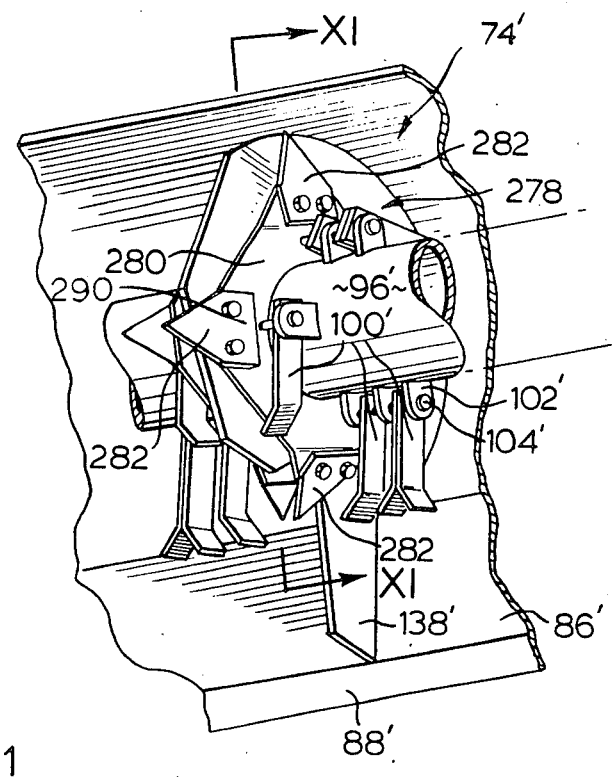
FIG. 10 is a perspective view of part of the flail assembly of a stack feeder according to a further embodiment of the invention.
Figure 11:
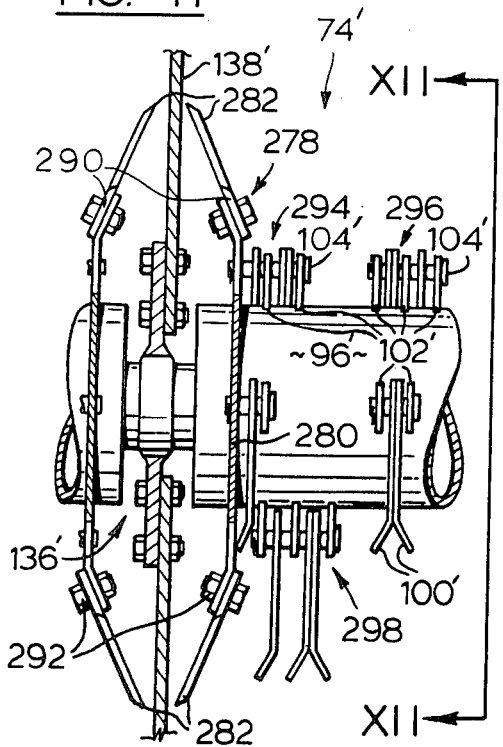
FIG. 11 is a longitudinal sectional view generally on line XI—XI of FIG. 10; and, FIG. 12 is a transverse sectional view on the line XII—XII of FIG. 11.
Figure 12:
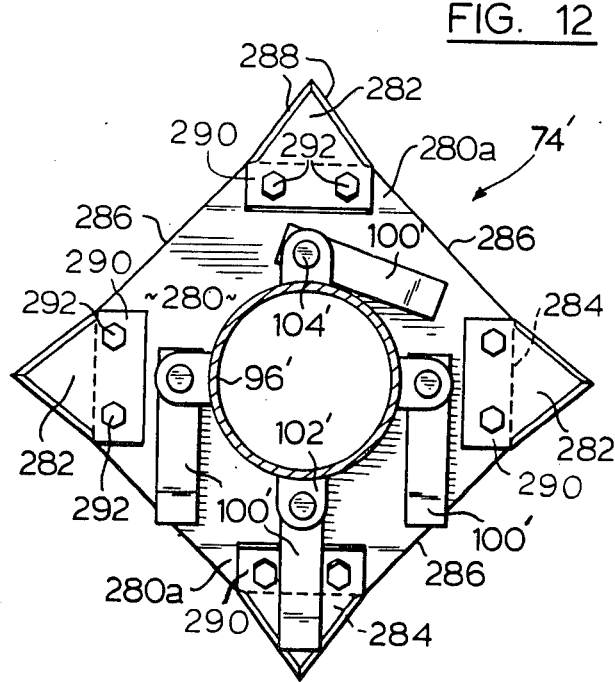

Reference will now be made to FIGS. 10, 11 and 12 which show a modified flail assembly, and in which primed reference numerals have been used to denote parts which correspond with parts shown in the previous figures.

FIGS. 10, 11 and 12 show the centre portion of the flail 74' of the modified flail assembly. The flail includes two tubular support sections 96' arranged in co-axial positions and rotatably supported at their inner ends by a bearing indicated at 136' carried by a plate 138' which forms part of the flail assembly. The outer ends of the sections 96' are supported as described above and the flail is driven at one end.

Each support section 96' of flail 74' has at its inner end a fixed blade assembly generally denoted 278. Each assembly 278 includes a plate 280 welded transversely to the relevant support 96' adjacent its inner end, and four blades 282 bolted to plate 280 at equally spaced angular positions and projecting outwardly of the plate. As can be seen from FIG. 12, plate 280 has the shape of an irregular octagon having four short edges 284 spaced by four longer edges 286. Each blade 282 has a triangular outer portion defining two inclined cutting edges 288 and an inner portion 290 which is secured to plate 280 by two bolts 292.

Two diametrally opposed ones of the blades 282 are bolted to portions 280a of plate 280 which are angled inwardly with respect to the remainder of the plate so that the relevant blades 282 are angled towards the support plate 138' for the flail centre bearing 136'. The other two blades 282 are disposed in a plane parallel to the plane containing plate 280. In FIGS. 10, 11 and 12, the two blades which are shown respectively above and below the flail support are angled. The arrangement is such that the tips of the angled blades of the fixed blade assembly 278 rotate closely adjacent to plate 138' when the flail is driven in rotation in use. When the flail is brought into contact with a haystack in use, the fixed blade assemblies 278 act upon and shred portions of the stack in the region of the flail support plate 138'. The described combination of angled and non-angled blades ensures thorough shredding of material in this region.

The external surface of each support section 96' carries a series of pivoted knives generally denoted 100' arranged in a helical configuration as described in connection with the preceding embodiment. The knives are arranged in pairs (as described above) except near the fixed knife assembly 278 where triple knives are used. In the arrangement of FIG. 11, the two knife assemblies 294,296 which are shown at the top nearest the fixed blade assembly 278 each include three knives 100' mounted on a common pin 104'. The pin 104' of assembly 296 is supported by three lugs 102', while in the case of the knife assembly 294, only two lugs are required, the pin 104' being passed through an aligned aperture in the plate 280 of the relevant fixed blade assembly 278. Similarly, a triple blade assembly is provided at the bottom of support section 96 as seen in FIG. 11 at 298. Due to the spiral configuration of the knives, this assembly is located generally intermediate the two triple blade assemblies at the top. Triple blade assemblies are not used in the row of knives between the top row and the bottom row, or in the corresponding row (not visible) at the other side of the support.

The triple-knife assemblies make for improved cutting efficiency at the inner ends of the respective flail sections. The blades are arranged to produce a flail which is dynamically balanced when in operation. For balancing purposes, triple knife assemblies are also used adjacent the outer ends (not shown) of the respective flail support sections. Accordingly, the knive density is greater at the end portions of each support section than between said portions.

It should finally be noted that the preceding description applies to specific embodiments of the invention only and that many modifications are possible within the broad scope of the invention.

For example, the shape of the hood 76 may be modified as indicated in chain dotted lines at 274 in FIG. 9. This shape provides a larger space 276 behind the flail into which hay can move if excessive hay buildup around the flail becomes a problem. However, the clearance between the top of the hood 76 and the flail knives in their extended position should not normally be increased beyond ¼ to ½ inch, at least for hay. A larger clearance would result in too much hay recirculating (i.e., continuing to circulate with the flail). This would tend to chop the material too finely and would also reduce the capacity of the machine.

In addition, and as previously mentioned, the rotational speed of the flail should be between 1,600 and 2,600 r.p.m. If the speed drops below this range, the knives will not swing out fully and the core of the flail (i.e., the tubular support sections 96) may begin to push on the stack, exerting downward pressure which, when released, can cause the stack to tip rearwardly as previously described. If the speed is too high, the material may be too finely shredded for normal purposes. Within the preferred speed range, the hay is shredded and fluffed up for more efficient use, and the flail assembly can be lowered so that it does not exert significant downward pressure on the leading edge of the stack. Also, it is found that a flail speed within the range indicated above has the effect of producing shredded hay which is apparently of improved palatability to cattle. This results in improved feeding efficiency. The hay produced is found to consist of a mixture of short and long pieces in contrast to evenly chopped hay produced by conventional material choppers. Evenly chopped hay is found to consist of pieces with relatively sharp ends which, when the hay is dry, may act as an irritant to the mouths and/or stomachs of feeding cattle.

The bearing arrangement provided between the support sections 96, while not essential, is preferred because it extends the life of the flail as compared with the use of a single long support tube. At the same time, the very thin bearing mechanism used ensures that the longitudinal interruption in the flail is minimal.

The stack feeder of the invention is essentially used in association with a stack mover. However, the stack mover need not be of the specific form shown. A simple non-tiltable conveyor would be adequate. In fact, the stack feeder of the present invention could be fitted with a simple conveyor to act as a stack mover.

In the embodiment described, the stack mover moves the haystack towards the stack feeder in stepwise fashion. In another embodiment, the haystack could be advanced continuously at an appropriate slow speed. The flail assembly would then be modified so that the flail could act on the haystack, both when moving upwardly and when moving downwardly.

In the embodiment described, the stack feeder is coupled between and supported by a tractor and a stack in use. If required, a pair of ground wheels, which may be retractable, can be provided on the base frame 20 of the stack feeder to support its weight during transportation.

What I claim is:

1. A stack feeder for use in association with a stack mover arranged to advance a haystack in a direction longitudinally of the stack feeder, the stack feeder comprising:

a base frame;

a flail assembly located above the base frame and positioned transversely with respect to said longitudinal direction;

means coupling the flail assembly to the base frame for pivotal movement with respect to the base frame about a horizontal axis so that the flail assembly can be moved up and down along an arcuate path above the frame;

means for moving the flail assembly along said arcuate path;

the flail assembly including: a rotary flail which comprises: an elongate cylindrical support rotatable about a horizontal axis and formed in two cylindrical sections arranged co-axially with respect to one another; axle means rigidly coupling the inner ends of said sections; two stub axles projecting from the respective outer ends of the sections; bearing means on said axle means; a thin plate supporting said bearing means and disposed between the inner ends of said cylindrical sections of the flail support; a plurality of knives carried by said support sections for action on a haystack in use, each said knife being coupled to the associated support section for free pivotal movement about an axis extending parallel to said horizontal axis of rotation of the support, whereby the knives can swing outwardly relative to the support when the flail is in use; a fixed blade assembly on each of said cylindrical support sections, each said fixed blade assembly being positioned adjacent said thin support plate for the bearing means and including a plate secured to the associated support section and positioned in a plane transverse to the longitudinal axis of the support; a plurality of fixed knives attached to and projecting outwardly of said plate, each said knife having an outer end and being positioned so that said end rotates closely adjacent to said thin support plate for the bearing means between the flail sections when the flail is in use; and a hood which extends longitudinally of the flail;

means for rotating the flail at a speed in the range 1,600 to 2,600 r.p.m.; and, conveyor means supported on the base frame below the flail assembly and extending transversely of the base frame to a discharge location laterally of said frame;

whereby, in use, the leading end portion of a haystack advanced to a position in said arcuate path of the flail assembly is shredded and fluffed up by the action of the rotary flail upon movement of the flail assembly along said path, and the resulting hay is directed downwardly onto the conveyor means for discharge at said discharge location.

2. A stack feeder as claimed in claim 1, wherein the hood of the flail assembly includes: a top portion which extends longitudinally above the flail, said portion being curved to conform generally with the profile of the flail and being arranged at a clearance in the range ¼ inch and ½ inch from the flail; a rear portion defining a spaced behind the flail; and a flexible shield which depends from said rear portion.

3. A stack feeder as claimed in claim 1, wherein the said base frame is adapted to be coupled to a tractor having a power take-off, whereby the stack feeder can be towed behind the tractor in use, and wherein the stack feeder further includes a drive input shaft adapted to be coupled to said power take-off, and wherein the said means for rotating the flail includes: a first drive shaft extending longitudinally of said base frame and driven from said input shaft; a second drive shaft extending transversely of said frame parallel to said elongate cylindrical support of the flail and driven from said first drive shaft; and means coupling said second drive shaft with one of said stub axles of the flail at one end of the latter; and wherein the conveyor means is coupled to said input shaft, whereby the flail and conveyor means can be driven together from the tractor power take-off in use.

4. A stack feeder as claimed in claim 1, wherein each of said fixed knife assembly includes four fixed blades each having a generally triangular outer portion defining two inclined cutting edges, and wherein each of two opposed ones of said knives is attached to a portion of the plate which is angled towards said plate supporting said bearing race.

5. A stack feeder as claimed in claim 1, wherein the pivoted knives are arranged in a configuration such that the knife density adjacent the end portions of the support is greater than the knife density over the part of the support between said end portions.

6. A stack feeder as claimed in claim 5, wherein the conveyor means includes a main portion supported on the base frame of the feeder, and adjacent the discharge end of the conveyor means, an extension which is pivotally coupled to the main portion of the conveyor means about a horizontal axis, whereby the said extension can be raised and lowered to vary the height at which hay is discharged from the conveyor means.

7. A stack feeder as claimed in claim 1, wherein the said conveyor means comprise: a pair of parallel endless chains extending transversely of the base frame of the feeder; a plurality of elongate members extending transversely of the conveyor means and coupled to said chains; a plurality of horizontal panels located below the upper runs of the chains and having upper surfaces to support hay falling onto the conveyor when the feeder is in use; and drive means for driving the said chains, in use, whereby said elongate members engage hay on said panels and convey the hay towards said discharge location.

* * * * *